United States Patent
Rollender

(10) Patent No.: US 6,493,553 B1
(45) Date of Patent: Dec. 10, 2002

(54) MOBILE-STATION ADAPTED FOR REMOVABLE USER IDENTITY MODULES

(75) Inventor: Douglas Harold Rollender, Bridgewater, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/344,583

(22) Filed: Jun. 25, 1999

(51) Int. Cl.[7] .................................................. H04Q 7/20
(52) U.S. Cl. ........................ 455/435; 455/558; 455/551; 455/432
(58) Field of Search ................................ 455/403, 410, 455/411, 414, 550, 551, 557, 558, 575, 90, 435, 422, 432

(56) References Cited

U.S. PATENT DOCUMENTS 5,748,720 A * 5/1998 Loder .......................... 455/550
6,223,052 B1 * 4/2001 Vehmas et al. .............. 455/551

FOREIGN PATENT DOCUMENTS

EP 0884916 A2 6/1998

OTHER PUBLICATIONS

"Removable User Indentity Module (R–UIM) for ANSI Based Third Generation Systems", by Ohashi, M. et al., IEEE, pp. 2334–2338 (May 15, 2000).

* cited by examiner

*Primary Examiner*—Doris H. To
(74) *Attorney, Agent, or Firm*—Jimmy Goo

(57) ABSTRACT

A mobile-station with an integrated user identity module (I-UIM) and a removable user identity module (R-UIM) that adheres to the second generation standard intersystem protocol for validation and authentication is disclosed herein. The I-UIM includes an integrated electronic serial number (I-ESN) and integrate-subscriber/subscription information, whereas the R-UIM includes a removable electronic serial number (R-ESN) and remote-subscriber/subscription information. The mobile-station will transmit either the I-UIM and integrated subscriber/subscription information pair or the R-UIM and remote subscriber/subscription information pair depending on the user of the mobile-station. A registry of I-ESNs paired with integrated-subscriber/subscription information and R-ESNs paired with remote-subscriber/subscription information will be maintained by wireless communications systems and/or authentication centers. Such registry is used to validate and authenticate I-ESN and integrated-subscriber/subscription information pairs, and R-ESN and remote-subscriber/subscription information pairs.

14 Claims, 5 Drawing Sheets

600

| | MOBILE-STATION WITH I-UIM | MOBILE-STATION WITH I-UIM AND R-UIM |
|---|---|---|
| ACTIVATE MOBILE-STATION | REGISTER MS WITH I-UIM ONLY | MS INITIATES SERVICE WITH THE SERVING SYSTEM BASED ON THE I-UIM, AND INITIATES REGISTRATION WITH HOME SYSTEM ASSOCIATED WITH R-UIM |
| ADD R-UIM | NOT APPLICABLE. | AFTER MS REGISTERS WITH I-UIM, THE ACT OF ADDING A R-UIM TO THE MS INITIATES A NEW REGISTRATION/VALIDATION/AUTHENTICATION TRANSACTION WITH THE SERVING SYSTEM |
| REMOVE R-UIM | MS STAYS IN SERVICE WITH THE I-UIM ONLY | MS STAYS IN SERVICE WITH THE I-UIM BUT NO LONGER RESPONDS TO PAGES OR ANY OTHER MESSAGES FROM THE SERVING SYSTEM ADDRESSED TO THE R-UIM |
| DEACTIVATE MOBILE-STATION | MS IS SHUT DOWN ONLY WITH I-UIM | R-UIM DEACTIVATED FOLLOWED IMMEDIATELY BY I-UIM DEACTIVATION |

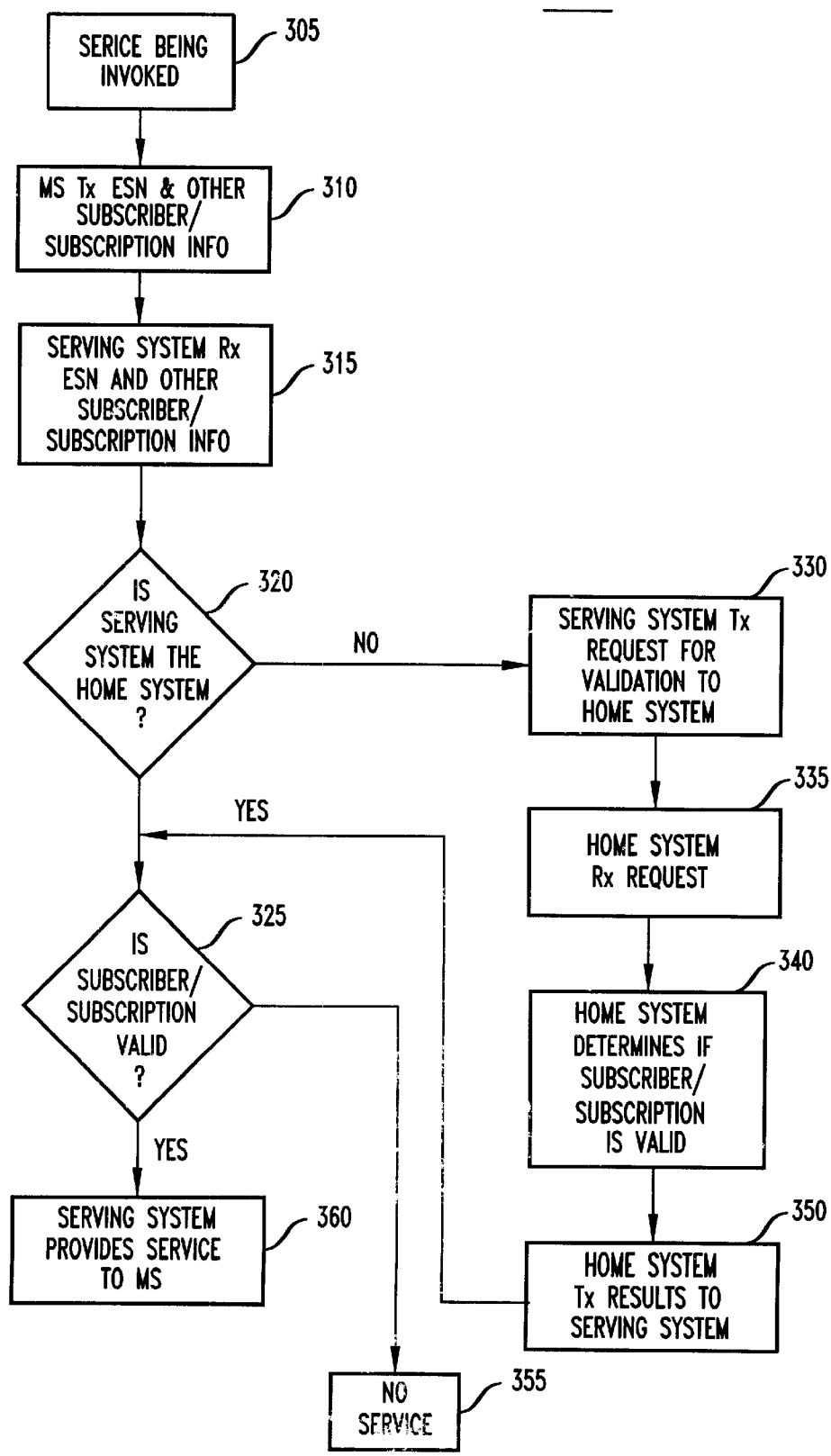

400

MOBILE-STATION ADAPTED FOR REMOVABLE USER IDENTITY MODULES

FIELD OF THE INVENTION

The present invention relates generally to wireless communications systems and, in particular, to mobile-stations for third generation wireless communications systems.

BACKGROUND OF THE RELATED ART

FIG. 1 depicts a second generation wireless communications system 10 in accordance with the prior art. Wireless communications system 10 comprises a plurality of base stations 12 and a plurality of mobile-stations 14. The Federal Communications Commission (FCC) requires a unique electronic serial number (ESN) to be integrated into each mobile-station 14, wherein the ESN indicates a mobile-station's make, model, manufacturer and/or features and subscriber/subscription information. By itself, the ESN can be used for mobile-related issues, such as theft detection, feature support identification and recall management.

Service providers of wireless communication systems have found other uses for the ESN. One such use is to combine the ESN with other subscriber/subscription information to validate and authenticate mobile-stations 14 and/or subscribers. Other subscriber/subscription information includes subscriber and/or service identifiers, such as mobile-station identifiers (also known as mobile identification numbers or MIN) and international mobile-station subscription identifiers (IMSI). Subscriber/subscription information is unique for each subscriber and is integrated into mobile-station 14. The subscriber/subscription information integrated in mobile-station 14 is hereinafter referred to as "integrated-subscriber/subscription information."

Wireless communications system 10 uses a second generation standard intersystem protocol for validating and authenticating mobile-stations. Wireless communications system 10 maintains a registry or database of ESNs and valid mobile-stations and subscribers for those users that subscribe to wireless communications system 10. For each ESN, there are associated one mobile-station and one subscriber/subscription in the registry—that is, an one-to-one relationship exist between ESNs and mobile-stations and between ESNs and subscribers/subscriptions. Since the subscriber/subscription information integrated into mobile-station 14 is typically that of the owner, the subscriber/subscription information maintained in the registry will also be that of the owner, i.e., subscriber/subscription information in registry is integrated-subscriber/subscription information for second generation wireless communications system 10. The second generation standard intersystem protocol requires that when mobile-station 14 attempts to invoke service, such as register or complete a call, from wireless communications system 10, mobile-station 14 transmits the ESN and other integrated-subscriber/subscription information integrated into mobile-station 14 to base station 12. The ESN and integrated-subscriber/subscription information are compared by wireless communications system 10 (or a home system if wireless communications system 10 is not the home system) to validate and authenticate mobile-station 14. If the transmitted ESN and integrated-subscriber/subscription information match the ESN and subscriber/subscription information in the registry, which should be the integrated-subscriber/subscription information, then mobile-station 14 is validated and authenticated. Once mobile-station 14 has been validated and authenticated, services will be provided to mobile-station 14 by wireless communications system 10.

For the next generation of wireless communications system (i.e., third generation), there exist a requirement for a user identity module (UIM), which is a logical entity having subscriber/subscription information including the MTN and/or IMSI. The UIM is required to be separable or removable from, and not integrated into, third generation mobile-stations. Such UIM is hereinafter referred to as a removable user identity module (R-UIM). Removable user identity modules would allow remote-subscribers, i.e., subscribers who are not integrated-subscribers, to use third generation mobile-stations not belonging to them by merely inserting their R-UIM into the mobile-station prior to invoking service. Thus, when a remote-subscriber attempts to invoke service using a third generation mobile-station, the ESN integrated into the mobile-station and the subscriber/subscription information in the R-UIM of the remote-subscriber, hereinafter referred to as "remote-subscriber/subscription information," are transmitted to the third generation wireless communications system for validation and authentication. Service providers, however, require third generation mobile-stations to also be capable of invoking service from second generation wireless communications systems. This would be a problem because second generation wireless communications systems use the second generation standard intersystem protocol to validate and authenticate mobile-stations. Specifically, the problem is that third generation mobile-stations cannot be validated and authenticated by second generation wireless communications systems because the transmitted remote-subscriber/subscription information (along with the ESN integrated into the mobile-station) will not match the subscriber/subscription information in the registry for the transmitted ESN, i.e., remote-subscriber/subscription information not identical to integrated-subscriber/subscription information.

One solution to this problem is to integrate the ESN into the R-UIMs and not into the mobile-stations such that the remote-subscriber info is now associated with a particular ESN. Thus, there exists an one-to-one relationship between ESNs and mobile-stations, and between ESNs and subscribers. This solution, however, is not feasible because the FCC requires the ESN to be integrated into the mobile-stations and be used to support mobile-station related issues independent of the subscriber, such as theft detection and feature support identification.

Another solution is to only use the subscriber/subscription information when validating and authenticating a mobile-station. This solution is also not feasible because service providers want third generation mobile-stations to adhere to the second generation standard intersystem protocol for validation and authentication such that third generation mobile-stations may be validated and authenticated by second generation wireless communications system. Additionally, without the ESN, the wireless communications system would not know what features are being supported by the mobile-station being used by the remote-subscriber.

A third solution would be for the wireless communications systems to maintain a registry in which more than one subscriber may be associated with each integrated ESN. This solution, however, is also not feasible because remote-subscribers would then be limited to using mobile-stations with integrated ESNs to which their remote-subscriber/subscription information (or R-UIM) are associated.

Accordingly, there exists a need for a third generation mobile-station having an integrated ESN that can be validated and authenticated by second generation wireless communication systems using remote-subscriber/subscription information.

SUMMARY OF THE INVENTION

The present invention is a mobile-station with an integrated user identity module (I-UIM) and a removable user identity module (R-UIM) that adheres to the second generation standard intersystem protocol for validation and authentication, wherein the I-UIM includes an integrated electronic serial number (I-ESN) and integrated-subscriber/subscription information and the R-UIM includes a removable electronic serial number (R-ESN) and remote-subscriber/subscription information. The mobile-station being capable of transmitting either the I-ESN and integrated-subscriber/subscription information pair or the R-ESN and remote-subscriber/subscription information pair depending on the user of the mobile-station. A registry of I-ESNs paired with integrated-subscriber/subscription information and R-ESNs paired with remote-subscriber/subscription information will be maintained by wireless communications systems and/or authentication centers. Such registry is used to validate and authenticate I-ESN and integrated-subscriber/subscription information pairs, and R-ESN and remote-subscriber/subscription information pairs.

In one embodiment, the mobile-station will use the I-ESN and integrated subscriber/subscription information for purposes of validation and authentication in the absence of a R-UIM. In the presence of a R-UIM, the mobile-station will use the R-ESN and remote subscriber/subscription information for purposes of validation and authentication unless otherwise indicated or directed by the user of the mobile-station. In another embodiment, the mobile-station will always use the I-ESN and/or integrated-subscriber/subscription information prior to using the R-ESN and/or remote-subscriber/subscription information.

Advantageously, the present invention allows wireless communications systems utilizing the second generation standard intersystem protocol to validate and authenticate subscribers using third generation mobile-stations. Additionally, the present invention satisfies the FCC requirements of having integrated ESNs to support mobile-station related issues independent of the subscriber, such as theft detection and feature support identification.

BRIEF DESCRIPTION OF THE DRAWINGS

The features, aspects, and advantages of the present invention will become better understood with regard to the following description, appended claims, and accompanying drawings where

FIG. 3 depicts a flowchart illustrating a manner for validation and authentication of the mobile-station of FIG. 2 supporting more than one subscriber;

DETAILED DESCRIPTION

Figure 2:
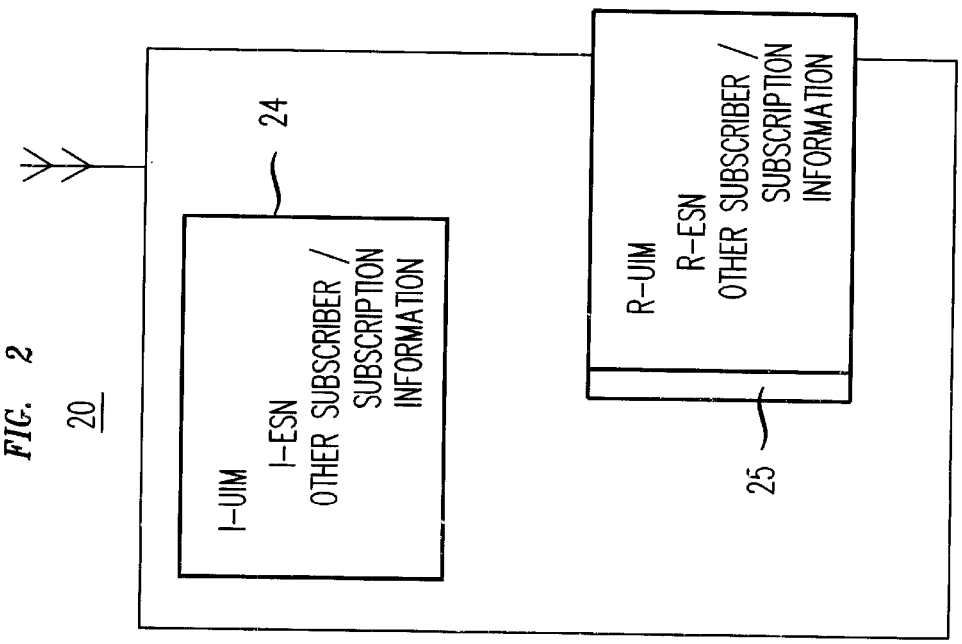
FIG. 2 depicts a mobile-station in accordance with the present invention.
Figure 1:
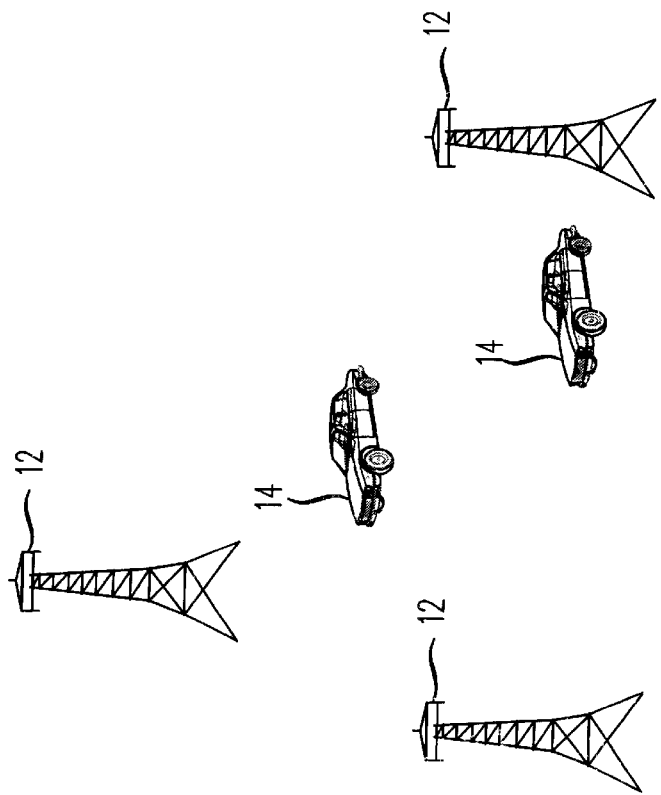
FIG. 1 depicts a second generation wireless communications system in accordance with the prior art.

FIG. 2 depicts a mobile-station 20 in accordance with the present invention. Mobile-station 20 has integrated an user identity module (UIM) 24 belonging to a subscriber of a wireless communications system, wherein user identity module 24 includes an ESN and other subscriber/subscription information indicated or not indicated by the ESN. Such UIM, ESN and other subscriber/subscription information are hereinafter referred to as an "integrated user identity module (I-UIM)," an "integrated electronic serial number (I-ESN)" and "integrated-subscriber/subscription information," respectively. The integrated user identity module comprises hardware or any data storage device for storing the I-ESN and integrated-subscriber/subscription information, such as computer memory.

Mobile-station 20 has a receptacle 25 that is adapted to receive input from a removable user identity module (R-UIM) 26, wherein removable user identity module includes a unique ESN (hereinafter referred to as a "removable electronic serial number" or R-ESN) and subscriber/subscription information belonging to another (or same) subscriber of the wireless communications system, i.e., remote-subscriber/subscription information. The removable user identity module comprises hardware or any data storage device for storing the R-ESN and remote-subscriber/subscription information, such as computer memory. Alternately, the R-ESN and remote-subscriber/subscription information may be stored on a scannable card, e.g., bar code. Receptacle 25 may be a port, such as a parallel or serial port, a scanning device for reading data from an image, or any device for receiving input from the R-UIM. Note that it should be understood that the term "subscriber" should be construed to include, and is not limited to, customers of the wireless communications system and non-customers of the wireless communications system, such as calling or phone card customers.

The I-ESN and R-ESN are values that are used by wireless communication systems that adhere to the second generation standard intersystem protocol for validation and authentication. In particular, both the l-ESN and R-ESN comply with a format defined by the second generation standard intersystem protocol. The I-ESN at least identifies the mobile-station in which it is integrated.

In one embodiment, the I-ESN and R-ESN both indicate information regarding the subscribers to which the associated UIM belongs. The I-ESN is distinguishable from the R-ESN in that the former ESN identifies the mobile-station in which it is integrated and also indicates the features supported by the mobile-station in which it is integrated—that is, the R-ESN does not identify a mobile-station and cannot directly indicate features supported by the mobile-station since it is not associated with or integrated into a particular mobile-station. The R-ESN functions only as subscriber/subscription information for purposes of satisfying the validation and authentication requirements of pre-third generation wireless communication systems, and may also indirectly indicate features supported by mobile-stations by assuming that each mobile-station support a certain minimal set of features. I-ESN functions as subscription information and as an equipment or features identifier.

Mobile-station 20 comprises a transmitter for transmitting the ESN and other subscriber/subscription information within the I-UIM and/or R-UIM if the R-UIM is available. The manner and order in which the ESN and subscriber/subscription information are transmitted may vary according to a number of factors, such as protocol and preferences of service providers, manufacturers and/or users.

FIG. 3 depicts a flowchart 300 illustrating a manner for validation and authentication of mobile-station 20 supporting more than one subscriber. In step 305, a subscriber attempts to invoke service, e.g., register, using mobile-station 20, wherein the subscriber may either be an integrated-subscriber or remote-subscriber. In step 310, mobile-station 20 transmits an ESN and other subscriber/subscription information. MS 20 will transmit the I-ESN and integrated-subscriber/subscription information and/or R-ESN and remote-subscriber/subscription information depending upon protocol or preferences of the service provider, manufacturer of mobile-station 20, or user of mobile-station 20.

In one embodiment, if a R-UIM is not inserted in mobile-station 20, mobile-station 20 transmits the I-ESN and integrated-subscriber/subscription information integrated into mobile-station 20. Otherwise mobile-station 20 transmits the R-ESN and remote-subscriber/subscription information, and not the 1-ESN and integrated-subscriber/subscription information, by default whenever R-UIM is inserted into mobile-station 20. The default may be overridden, i.e., mobile-station transmits I-ESN and integrated-subscriber/subscription information instead of R-ESN and remote-subscriber/subscription information when R-UIM is inserted, by inputting a code (or flipping a switch) prior to attempting to invoke service.

Figure 6:
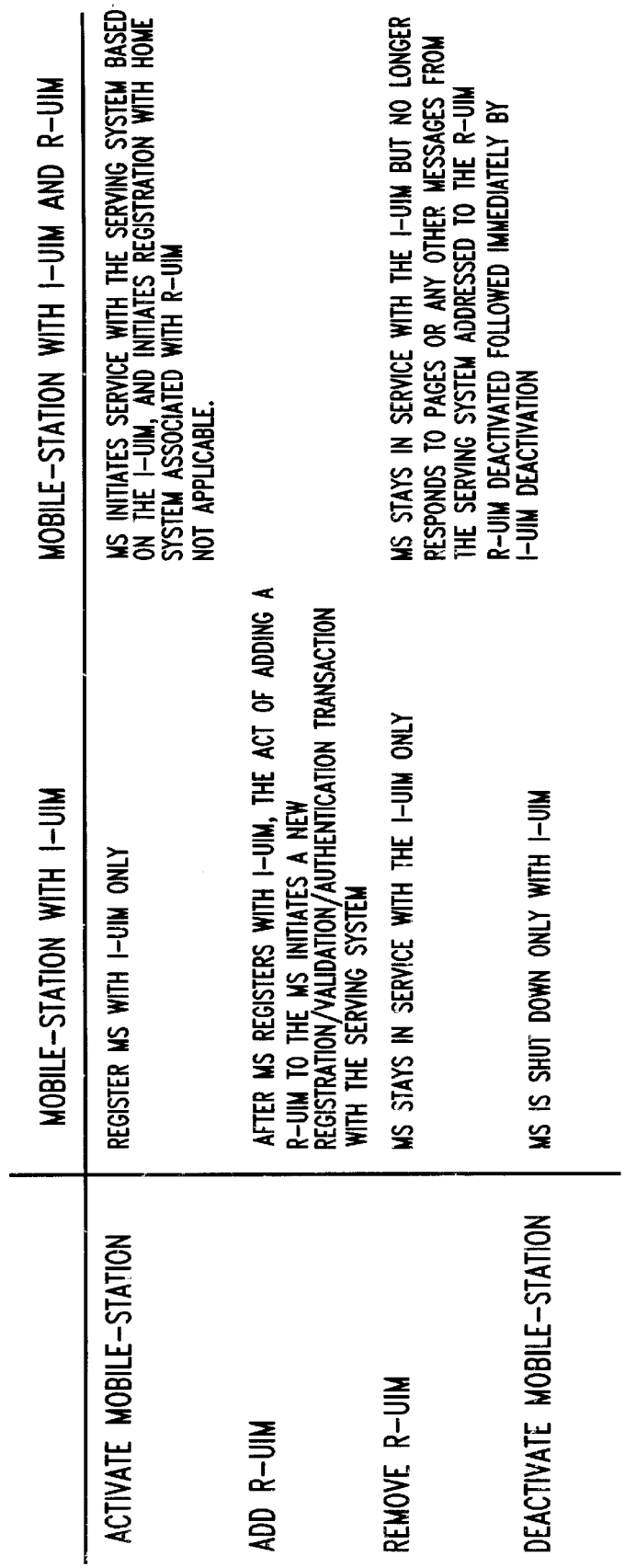
FIG. 6 depicts a chart illustrating a set of possible actions by the mobile-station for possible events when the mobile-station has or does not have a R-UIM.

In another embodiment, mobile-station 20 will only transmit the R-ESN and remote-subscriber/subscription information only after mobile-station 20 had earlier been successful in invoking service using the I-ESN and integrated-subscriber/subscription information. In other embodiments, the 1-ESN and integrated-subscriber/subscription information are always transmitted initially by mobile-station 20, or the I-ESN and integrated-subscriber/subscription information are transmitted as directed by the user or subscriber. FIG. 6 depicts a chart 600 illustrating a set of possible actions by mobile-station 20 for possible events when mobile-station 20 has or does not have a R-UIM.

The validation and authentication of subscribers are, in one embodiment, independent of each other. If the subscriber associated with the I-UIM is not a valid subscriber, the subscriber associated with the R-UIM may nevertheless be validated and authenticated by the appropriate system, and vice-versa.

In steps 315 and 320, the serving system receives the ESN and other subscriber/subscription information transmitted by mobile-station 20 and uses the subscriber/subscription information, such as the MIN or IMSI, to determine whether the serving system is a home system for the subscriber associated with the received ESN, wherein the home system is a wireless communications system to which a subscriber has a subscription for wireless communications services or any other type of entity to which a subscriber previously paid or may be billed for wireless communications services. If the serving system is the subscriber's home system, in step 325, the serving system determines whether service should be provided to the subscriber, i.e., validate and authenticate subscriber, by comparing the received ESN and subscriber/subscription information to the ESN and subscriber/subscription information being maintained in its registry. The types of services to be provided to the subscriber would depend on the features supported by mobile-station 20 as indicated by the ESN and the subscription of the subscriber.

If the ESN and subscriber/subscription information matches the ESN and subscriber/subscription information in the registry of the serving system, in step 360, the serving system will provide wireless communications services to the subscriber within the limitations of the features supported by mobile-station 20, such as voice messaging, call forwarding and call waiting features, and services subscribed to by the subscriber, such as call origination, call reception, voice messaging, call forwarding and/or call waiting. Otherwise, no wireless communications service will be provided by the serving system.

If the serving system is not the subscriber's home system, in step 330, the serving system transmits a request to the home system to validate and authenticate the subscriber. In step 335, the home system receives the ESN and subscriber/subscription information from the serving system. In step 340, the home system compares the received ESN and subscriber/subscription information to the ESN and subscriber/subscription information being maintained in its registry. If the ESN and subscriber/subscription information matches the ESN and subscriber/subscription information in the registry of the home system, in step 350, the home system transmits a message to the serving system indicating that the subscriber is valid and authenticated. Additionally, the message can include information about features supported by mobile-station 20 and services subscribed to by the subscriber. Upon receipt of this message, in steps 325 and 360, the serving system will provide wireless communications services to the subscriber within the limitations of the features supported by mobile-station 20 and services subscribed to by the subscriber.

If the ESN and subscriber/subscription information does not match the ESN and subscriber/subscription information in the registry of the home system, in step 350, the home system transmits a message to the serving system indicating that the subscriber is not valid and not authenticated. Upon receipt of this message, in steps 325 and 355, the serving system will deny wireless communications services to mobile-station 20.

Figure 4:
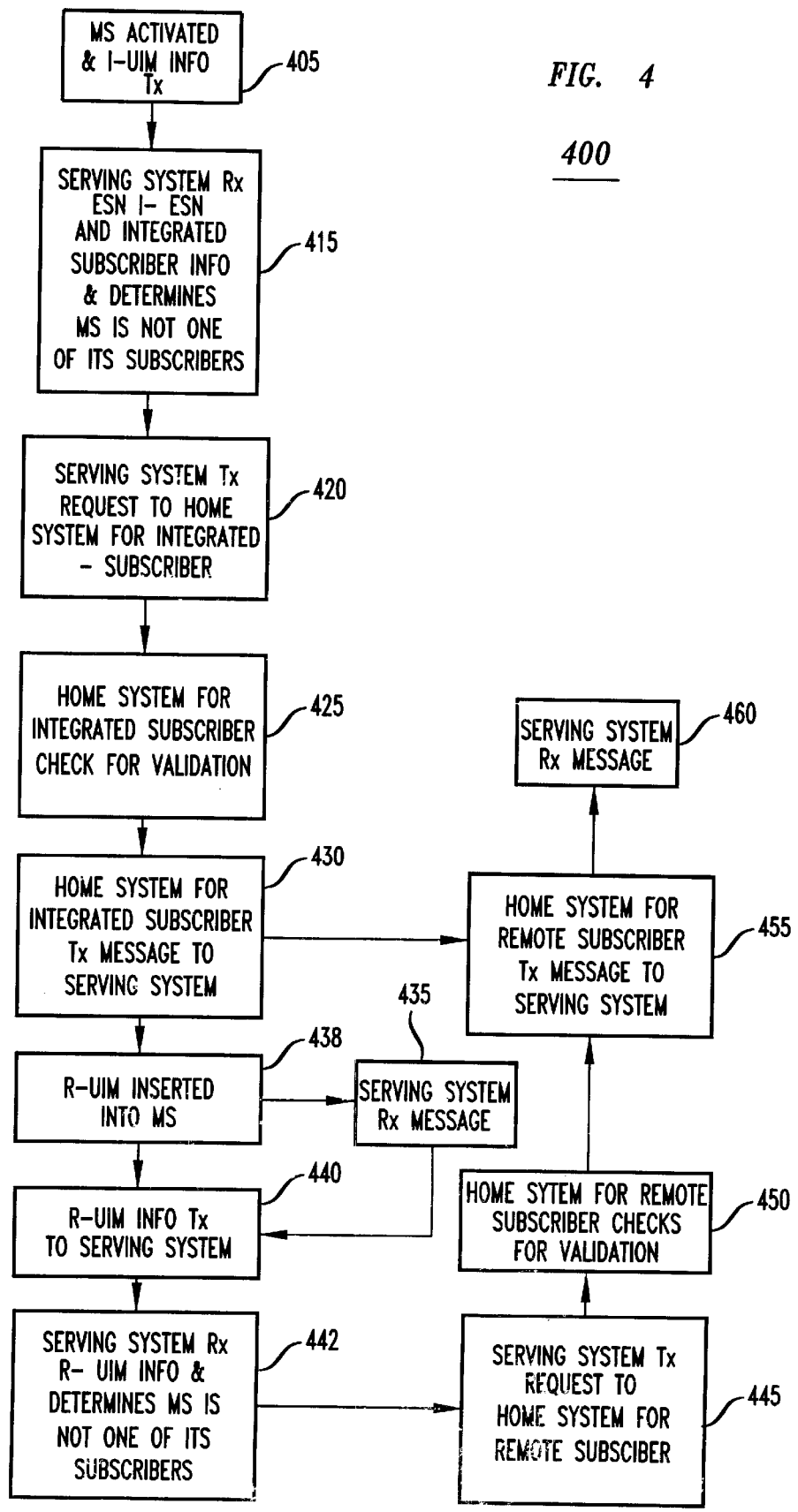
FIG. 4 depicts a flowchart illustrating a typical scenario in which service is being invoked by an integrated-subscriber and remote-subscriber using the mobile-station of FIG. 2.
Figure 5:
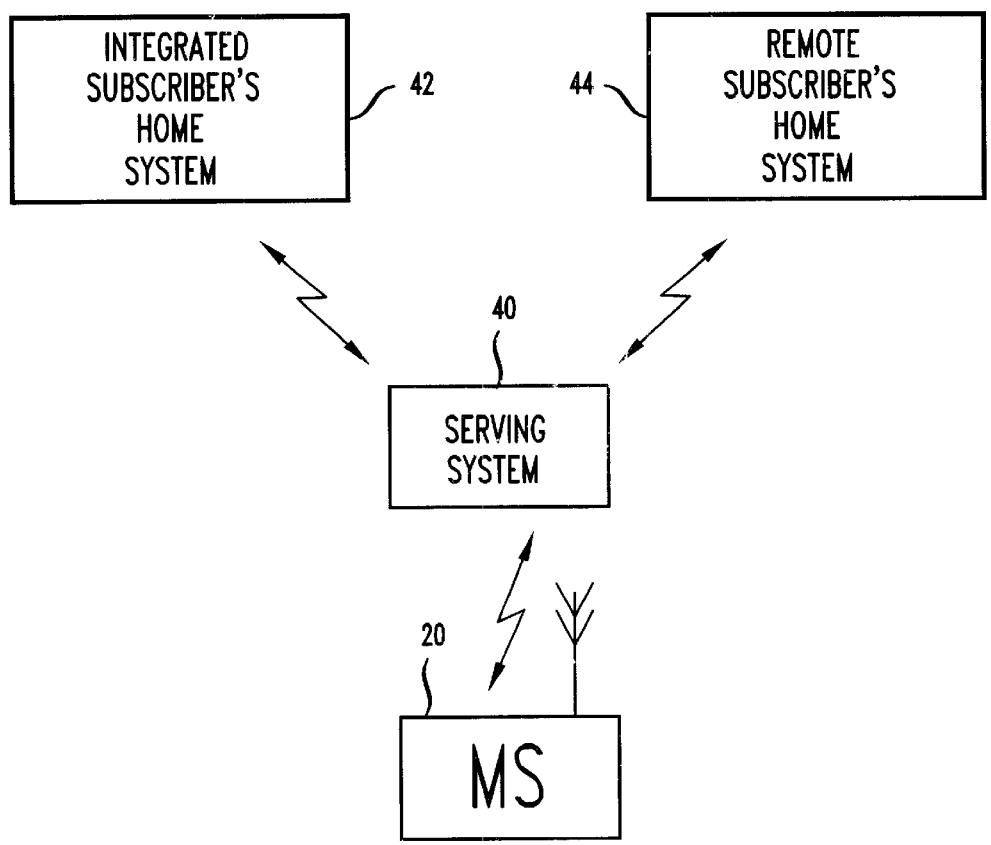
FIG. 5 depicts an example of a relationship between the serving system and home systems of the mobile-station.

FIG. 4 depicts a flowchart 400 illustrating a typical scenario in which service is being invoked by an integrated-subscriber and remote-subscriber using mobile-station 20. In this scenario, the serving system is neither the home system for the integrated-subscriber nor remote-subscriber. See FIG. 5, which depicts the relationships between the serving system and home systems. In the scenario of FIG. 4, in step 405, mobile-station 20 is activated, and the I-ESN and integrated-subscriber/subscription information integrated into mobile-station 20 are transmitted to serving system 40. In step 415, serving system 40 receives the I-ESN and integrated-subscriber/subscription information and determines from the received I-ESN and/or integrated-subscriber/subscription information that the integrated-subscriber is not one of its subscribers, i.e., serving system 40 is not the home system of the integrated-subscriber. In step 420, serving system 40 transmits a request having the received I-ESN and integrated-subscriber/subscription information to the home system of the integrated-subscriber, i.e., integrated-subscriber home system 42, to validate and authenticate the integrated-subscriber.

In step 425, integrated-subscriber home system 42 receives the I-ESN and integrated-subscriber/subscription information, and checks its registry to determine whether the subscriber associated with the received 1-ESN and integrated-subscriber/subscription information is a valid subscriber. In step 430, integrated-subscriber home system 42 transmits a message to serving system 40 indicating whether the integrated-subscriber is a valid subscriber. If the subscriber is a valid one, the message may also indicate the features supported by mobile-station 20 and the services subscribed to be the integrated-subscriber. In step 435, serving system 40 receives the message and either provides or denies wireless communications services to the integrated-subscriber depending on the message.

In step 438, a R-UIM is inserted into mobile-station 20 by a remote-subscriber. In step 440, the remote subscriber attempts to invoke service by transmitting his/her R-ESN and remote-subscriber/subscription information to serving system 40. In step 442, serving system receives the R-ESN and remote-subscriber/subscription information and determines from the received the R-ESN and/or remote-subscriber/subscription information that the remote-subscriber is not one of its subscribers. In step 445, serving system 40 transmits a request having the received R-ESN and remote-subscriber/subscription information to the home system of the remote-subscriber, i.e., remote-subscriber home system 44, to validate and authenticate the remote-subscriber.

In step 450, remote-subscriber home system 44 receives the R-ESN and remote-subscriber/subscription information, and checks it registry to determine whether the subscriber associated with the received R-ESN and remote-subscriber/subscription information is a valid subscriber. In step 455, remote-subscriber home system 42 transmits a message to serving system 40 indicating whether the remote-subscriber is a valid subscriber. If the subscriber is a valid one, the message may also indicate the services subscribed to be the integrated-subscriber, such as a minimum set of services, a predefined set of services or a set of services to be limited by the features supported by mobile-station 20. In step 460, serving system 40 receives the message and either provides or denies wireless communications services to the remote-subscriber depending on the message.

If the integrated-subscriber subsequently attempts to invoke service from server system 40, mobile-station 20 should transmit the ESN and subscriber/subscription information belonging to the integrated-subscriber. In order to transmit the I-ESN and integrated-subscriber/subscription information, the integrated-subscriber may be required to first enter a code, remove the R-UIM or flip a switch prior to attempting to invoke service.

For inbound services, the serving station provides the mobile-station with the identity of the subscriber to which the service is intended. Upon receiving the identity, the mobile-station then may indicate the intended recipient of the service either through a display on the mobile-station or a distinct tone. For security purposes, the intended recipient may be required to provide a security code or voice check before receiving the service.

The present invention is described herein with reference to certain embodiments. Other embodiments are possible. For example, the mobile-station also transmits the I-ESN and/or integrated subscriber/subscription information when transmitting the R-ESN and/or remotesubscriber/subscription information such that the wireless communications system knows which mobile-station is being used by remote-subscribers. Accordingly, the present invention should not be limited to the embodiments disclosed herein.

I claim:

1. A method of validating a mobile-station comprising the steps of:
   transmitting an integrated electronic serial number and integrated subscriber/subscription information associated with the integrated electronic serial number; and
   transmitting a removable electronic serial number and remote subscriber/subscription information associated with the removable electronic serial number only after transmission of the integrated electronic serial number and integrated subscriber/subscription information, the removable electronic serial number being different from the integrated serial number.

2. The method of claim 1, wherein the integrated electronic serial number and integrated subscriber/subscription information are transmitted when the mobile-station is activated.

3. The method of claim 1, wherein the integrated electronic serial number and integrated subscriber/subscription information are transmitted when a subscriber directs the mobile-station to transmit the integrated electronic serial number and integrated subscriber/subscription information instead of the removable electronic serial number and remote subscriber/subscription information.

4. A method of validating a mobile-station comprising the steps of:
   transmitting an integrated electronic serial number and integrated subscriber/subscription information associated with the integrated electronic serial number; and
   transmitting a removable electronic serial number and remote subscriber/subscription information associated with the removable electronic serial number when the mobile-station receives input from a removable user identity module, the removable electronic serial number being different from the integrated serial number, wherein the integrated electronic serial number and integrated subscriber/subscription information are transmitted at the same time when the removable electronic serial number and remote subscriber/subscription information are transmitted.

5. A mobile-station comprising:
   an integrated user identity module having a first electronic serial number and a first subscriber/subscription information associated with the first electronic serial number;
   a receptacle for receiving input from a removable user identity module having a second electronic serial number and a second subscriber/subscription information associated with the second electronic serial number; and
   means for transmitting the second electronic serial number and the second subscriber/subscription information only after transmission of the integrated electronic serial number and integrated subscriber/subscription information.

6. The mobile-station of claim 5 comprising:
   a transmitter for transmitting the first electronic serial number and the first subscriber/subscription information, and for transmitting the second electronic serial number and the second subscriber/subscription information if the receptacle receives input from the removable user identity module.

7. The mobile-station of claim 5, wherein the integrated user identity module includes a data storage device in which the first electronic serial number and the first subscriber/subscription information are stored.

8. The mobile-station of claim 5, wherein the data storage device is a computer memory.

9. The mobile-station of claim 5, wherein the receptacle is a port for receiving data from the removable user identity module.

10. The mobile-station of claim 5, wherein the receptacle is a scanning device for reading data from an image.

11. The mobile-station of claim 5 further comprising:

the removable user identity module.

12. The mobile-station of claim 5 further comprising:

means for transmitting the integrated electronic serial number and integrated subscriber/subscription information when the mobile-station is activated.

13. The mobile-station of claim 5 further comprising:

means for transmitting the integrated electronic serial number and integrated subscriber/subscription information when directed to transmit the integrated electronic serial number and integrated subscriber/subscription information instead of the removable electronic serial number and remote subscriber/subscription information.

14. A mobile-station comprising:

an integrated user identity module having a first electronic serial number and a first subscriber/subscription information associated with the first electronic serial number;

a receptacle for receiving input from a removable user identity module having a second electronic serial number and a second subscriber/subscription information associated with the second electronic serial number; and means for transmitting the integrated electronic serial number and integrated subscriber/subscription information at the same time when the removable electronic serial number and remote subscriber/subscription information are transmitted.

\* \* \* \* \*